United States Patent
Ikedo et al.

[11] Patent Number: 6,151,279
[45] Date of Patent: *Nov. 21, 2000

[54] SINGLE MOTOR DISC PLAYER WITH A GENEVA MECHANISM

[75] Inventors: Yuji Ikedo; Ken Okamura; Hideo Ito; Kuniya Satomi, all of Saitama-ken, Japan

[73] Assignee: Pioneer Electronic Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/898,005

[22] Filed: Jul. 25, 1997

[30] Foreign Application Priority Data

Jul. 31, 1996 [JP] Japan ................................ 8-202222

[51] Int. Cl.[7] .......................... G11B 17/24; G11B 25/02
[52] U.S. Cl. ............................................ 369/37; 369/178
[58] Field of Search .......................... 369/37, 75.2, 77.1, 369/178, 75.1, 191; 360/98.04, 98.06

[56] References Cited

U.S. PATENT DOCUMENTS

| | | | |
|---|---|---|---|
| 4,270,153 | 5/1981 | Bejerano | 360/78 |
| 4,282,778 | 8/1981 | Yang et al. | 74/820 |
| 5,132,863 | 7/1992 | Kakizaki | 360/137 |
| 5,173,889 | 12/1992 | Nagahisa et al. | 369/37 |
| 5,218,592 | 6/1993 | Isshiki et al. | 369/75.2 |
| 5,251,195 | 10/1993 | Kawakami et al. | 369/75.2 |
| 5,422,869 | 6/1995 | Versleegers | 369/37 |
| 5,555,227 | 9/1996 | Kurosu | 369/37 |
| 5,563,857 | 10/1996 | Park | 369/37 |

FOREIGN PATENT DOCUMENTS 5-166281  7/1993  Japan.
6-36515   2/1994  Japan.

*Primary Examiner*—Brian E. Miller
*Assistant Examiner*—Kenneth W. Fields
*Attorney, Agent, or Firm*—Morgan, Lewis & Bockius LLP

[57] ABSTRACT

There is provided a disc player which comprises a base section, a loading section linearly movably mounted on the base section, a rotary tray rotatably mounted on the loading section for receiving a plurality of discs, a driving motor provided in the loading section for producing a driving force, a turn table provided under the rotary tray. The disc player further includes a first operating mechanism for transmitting a driving force from the driving motor to the rotary tray, and for moving down the turn table when the rotary tray is to be rotated, a second operating mechanism for transmitting a driving force from the driving motor to said loading section to cause the loading section to linearly move with respect to said base section, a change-over for selecting an operation of the first operating mechanism or the second operating mechanism.

19 Claims, 11 Drawing Sheets

SINGLE MOTOR DISC PLAYER WITH A GENEVA MECHANISM

BACKGROUND OF THE INVENTION

The present invention relates to a disc player, particularly to a disc player having a rotary tray capable of receiving a plurality of discs.

There has been known a disc player which includes a rotary tray capable of receiving a plurality of discs, and in which there is only one power source needed for disc loading, tray rotation and disc clamping.

Japanese Patent Application Laid-open No. 5-166281 has suggested a disc player which is a roulette type disc reproducing device having a tray loading means, and in which only one motor is needed for moving a tray, turning a turn table, and moving up or down an optical pickup unite.

Further, Japanese Patent Application Laid-open No. 6-36515 has suggested a change-over mechanism for use in a disc player, in which only one motor is needed to carry out operations including loading a disc, turning a turn table and chucking a disc.

However, in any of the above prior art, although only one motor is needed to carry out operations including disc loading, tray rotation and disc clamping, a change-over mechanism for changing from one operation to the other will be indispensable, resulting in a complicated structure of a disc player.

Further, since a conventional disc player has its loading tray separated from its driving system, if a force in the loading direction is accidentally exerted on a rotating tray, the loading tray will be liable to move undesirably, resulting in a trouble in the mechanical connection between the driving system and the loading tray. As a result, a driving force fails to be transmitted from the driving system to the loading tray.

Moreover, in a conventional disc player, a rotary tray and a driving force transmitting means (usually a cam) are connected with each other by virtue of a gear. Accordingly, when the cam starts to rotate, the angular velocity of the rotary tray will suddenly become maximum. On the other hand, when the cam is about to stop, the angular velocity of the rotary tray will suddenly become zero. Consequently, the discs mounted on the rotary tray will be undesirably vibrated, causing a damage to the discs.

SUMMARY OF THE INVENTION

It is an object of the present invention to provide an improved disc player which is adapted to perform operations including disc loading, rotary tray rotation and disc clamping using only one power source.

It is another object of the present invention to provide an improved disc player which has an improved mechanical connection between a rotary tray and a driving force transmitting means, so as to ensure that a driving force can be exactly transmitted from the driving system to the loading tray.

It is a further object of the present invention to provide an improved disc player which can ensure a smooth rotation of a rotary tray even at the beginning or ending of the rotation, thus avoiding a possible damage to the discs mounted on the rotary tray.

According to the present invention, there is provided a disc player comprising: a base section; a loading section linearly movably mounted on the base section; a rotary tray rotatably mounted on the loading section for receiving a plurality of discs; a driving motor provided in the loading tray for producing a driving force; a turn table provided under the rotary tray, said turn table being capable of moving up and down, so as to mount a disc when the turn table moves up; a first operating mechanism for transmitting a driving force from the driving motor to the rotary tray, and for moving down the turn table when the rotary tray is to be rotated; a second operating mechanism for transmitting a driving force from the driving motor to said loading section to cause the loading section to linearly move with respect to said base section; a change-over means for selecting an operation of the first operating mechanism or the second operating mechanism.

Specifically, the first operating mechanism includes a cam unit and a Geneva structure, the second operating mechanism includes a planetary gear and a rack.

Further, the change-over means includes a lock lever having a lock pin to engage in a lock groove formed in a cam unit so as to lock the cam unit.

In addition, the change-over means is adapted to restrict the movement of the loading section.

The above objects and features of the present invention will become more understood from the following description with reference to the accompanying drawings.

DETAILED DESCRIPTION OF THE PREFERRED EMBODIMENTS

Figure 1:
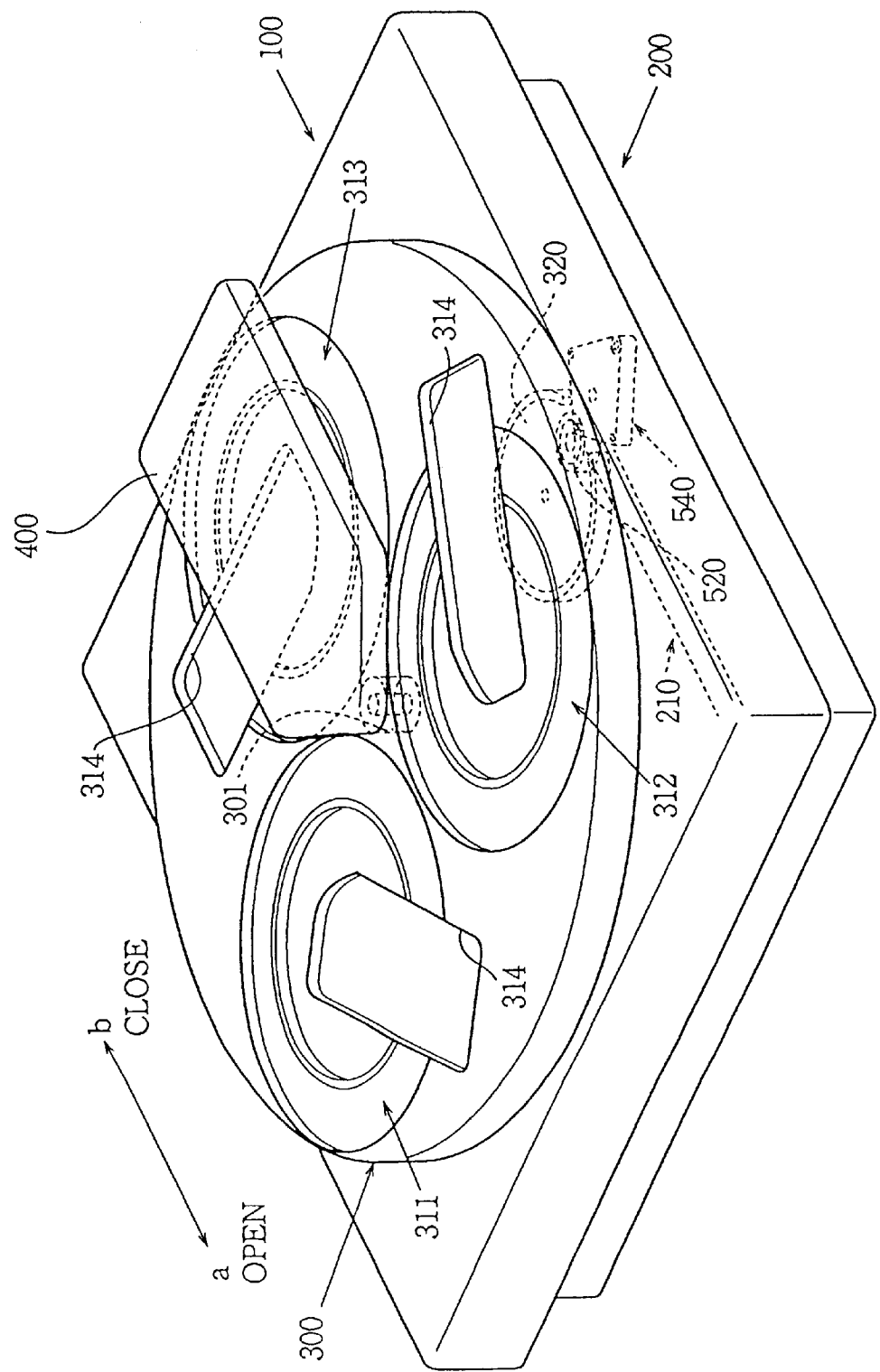
FIG. 1 is a perspective view showing a disc player according to the present invention, with the loading section thereof in its closed position.
Figure 2:
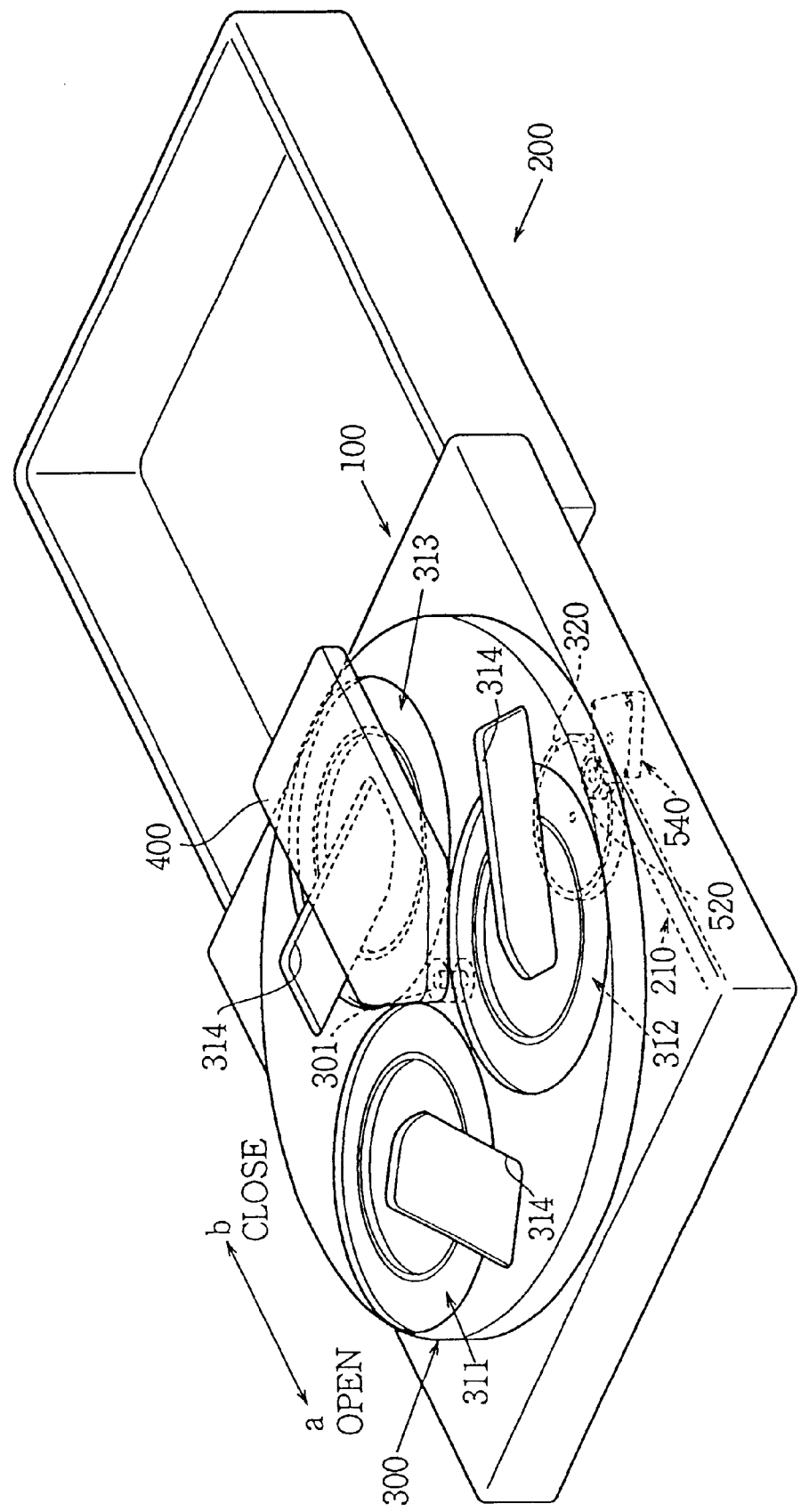
FIG. 2 is a perspective view showing the disc player of FIG. 1, with the loading section thereof in its opened position.

FIGS. 1 and 2 illustrate a disc player according to an embodiment of the present invention. As shown in FIGS. 1 and 2, the disc player has a base section 200 and a loading tray 100 which is mounted on the base section 200 in a manner such that it can freely linearly move with respect to the base section 200 in both an opening direction a and a closing direction b.

Figure 7:
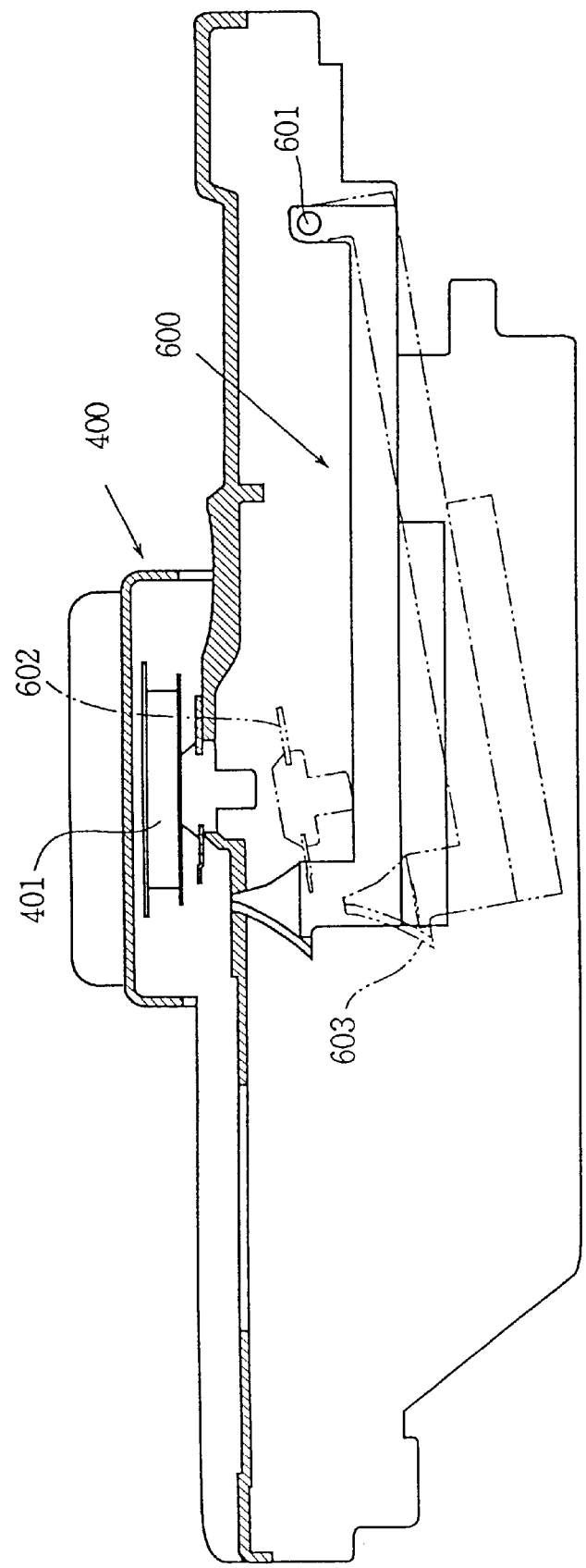
FIG. 7 is a cross sectional view illustrating a turn table base of the loading section of the disc player shown in FIG. 1.

On the loading section 100 there is mounted a rotary tray 300 which is supported on a shaft 301 serving as a fulcrum when the rotary tray 300 rotates. The rotary tray 300 carries a plurality of disc receiving sections 311–313 capable of receiving discs having a size of 12 cm and discs having a size of 8 cm. Each of the disc receiving sections 311–313 has a hole 314 which is formed to allow the passing of a turn table 602 (FIG. 3) and the reading of optical information of a disc by an optical pickup (not shown). Moreover, on the underside of the loading section 100, there is provided a clamper holder 400 for holding a clamper 401 (FIGS. 4 and 7).

Figure 3:
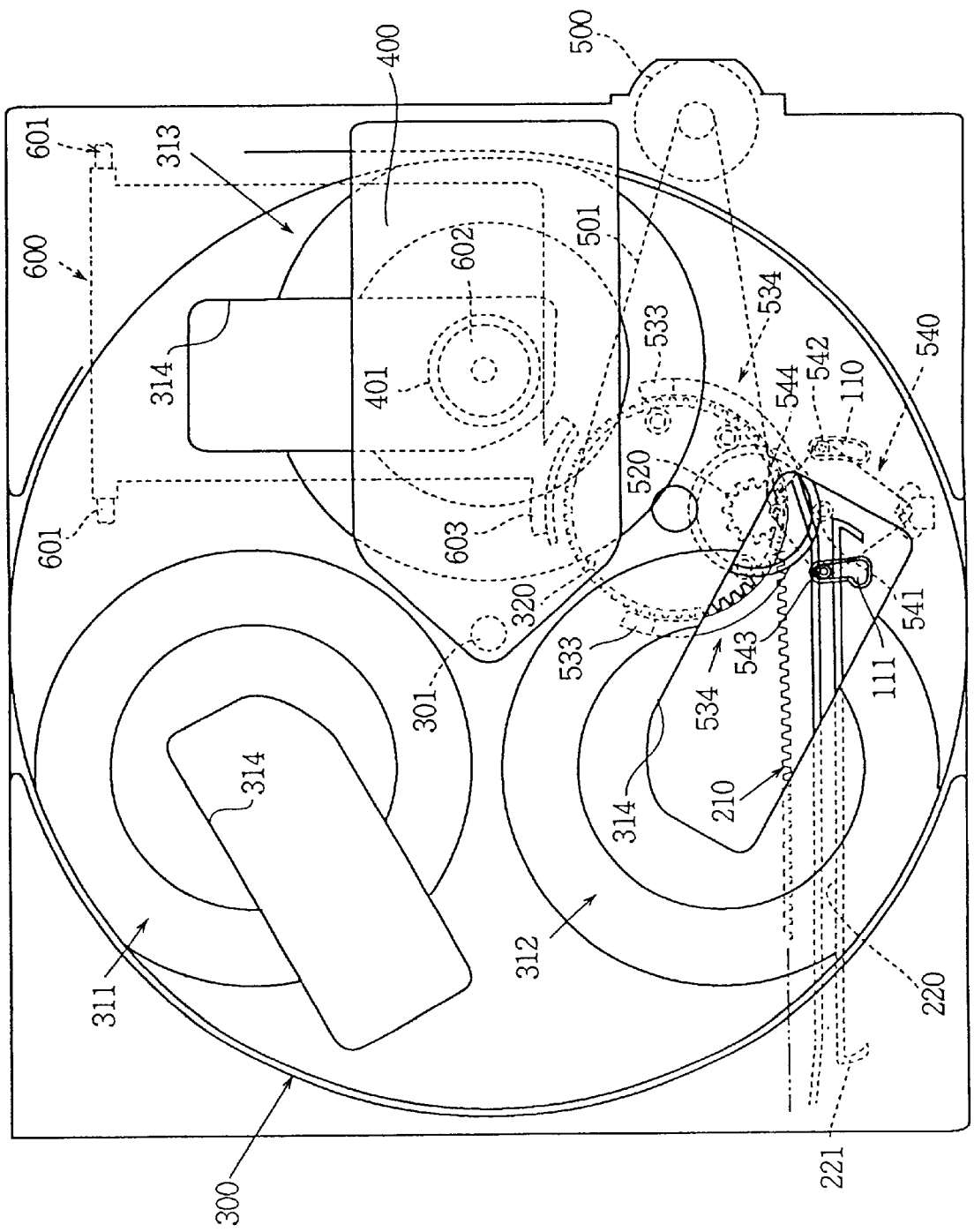
FIG. 3 is a plane view showing the loading section and a rotary tray of the disc player of FIG. 1.
Figure 4:
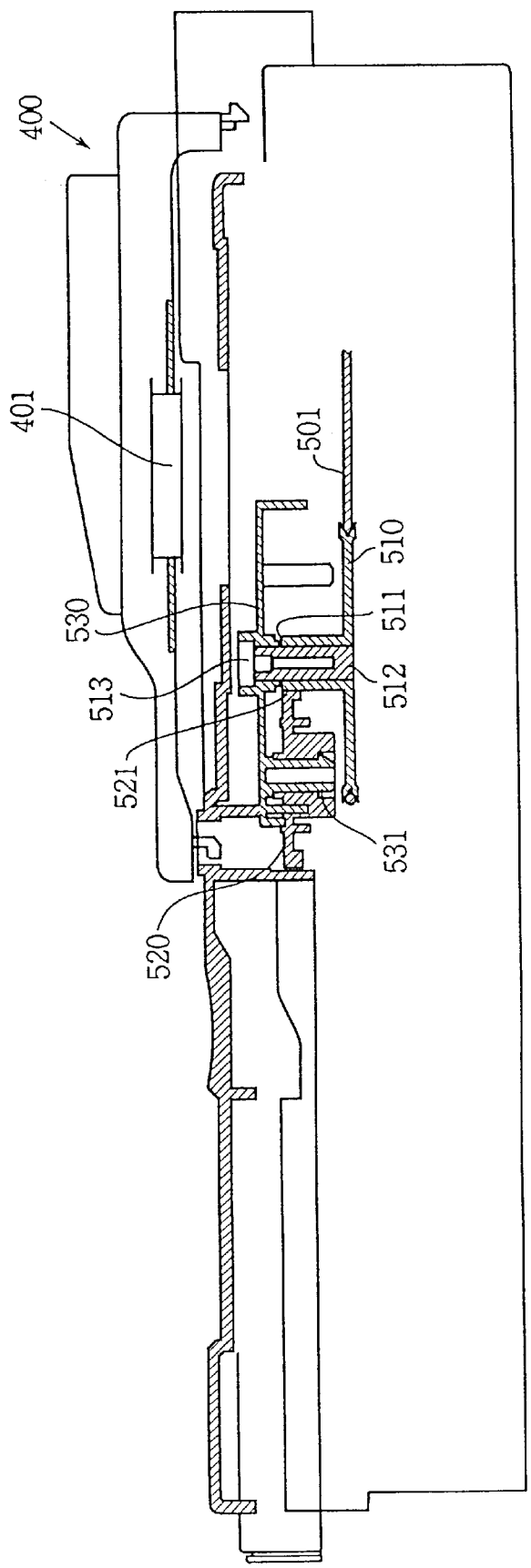
FIG. 4 is a cross sectional view showing the internal structure of the loading section of of the disc player shown in FIG. 1.
Figure 5:
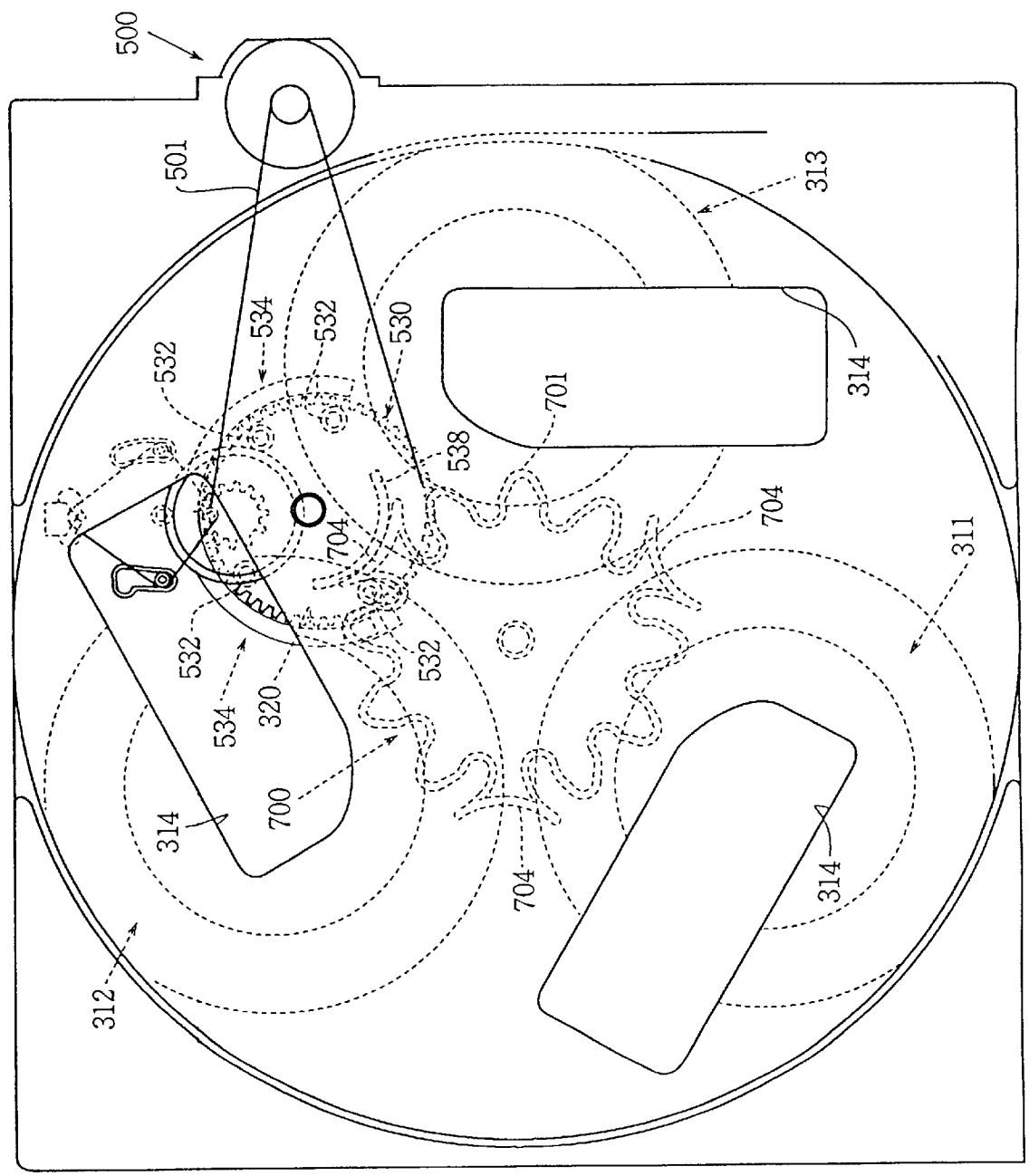
FIG. 5 is a plane view showing a Geneva structure provided on the underside of the rotary tray of the disc player shown in FIG. 1.

FIGS. 3–5 indicate a driving system of the disc player according to the embodiment of the present invention. As shown in FIGS. 3–5, the loading section 100 is provided with a driving motor 500 which is used to drive the rotary tray 300, and to cause the loading section 100 to move in both the opening direction a and the closing direction b.

In detail, the driving force from the motor 500 is transmitted through a belt 501 to a gear pulley 510. As shown in FIG. 4, the gear pulley 510 has a gear portion 511 engaging with a gear portion 521 of a planetary gear 520. In this way, a driving force may be transmitted from the motor 500 to the planetary gear 520.

On the other hand, the planetary gear 520 may engage with a rack 210 provided on the base section 200, or engage with a circular arc stationary gear portion 320 provided on the loading section 100.

Referring to FIG. 4, a cam unit 530 is connected through a sleeve 512 and a screw 513 to the gear portion 511 of the gear pulley 510. The cam unit 530 is provided with a projection 531 which is connected with the central portion of the planetary gear 520, such that the planetary gear 520 is freely rotatable thereon. In this construction, when the planetary gear 520 engages with the stationary gear portion 320 and revolves accordingly, the cam unit 530 will also rotate in the same direction as the planetary gear 520.

Figure 6:
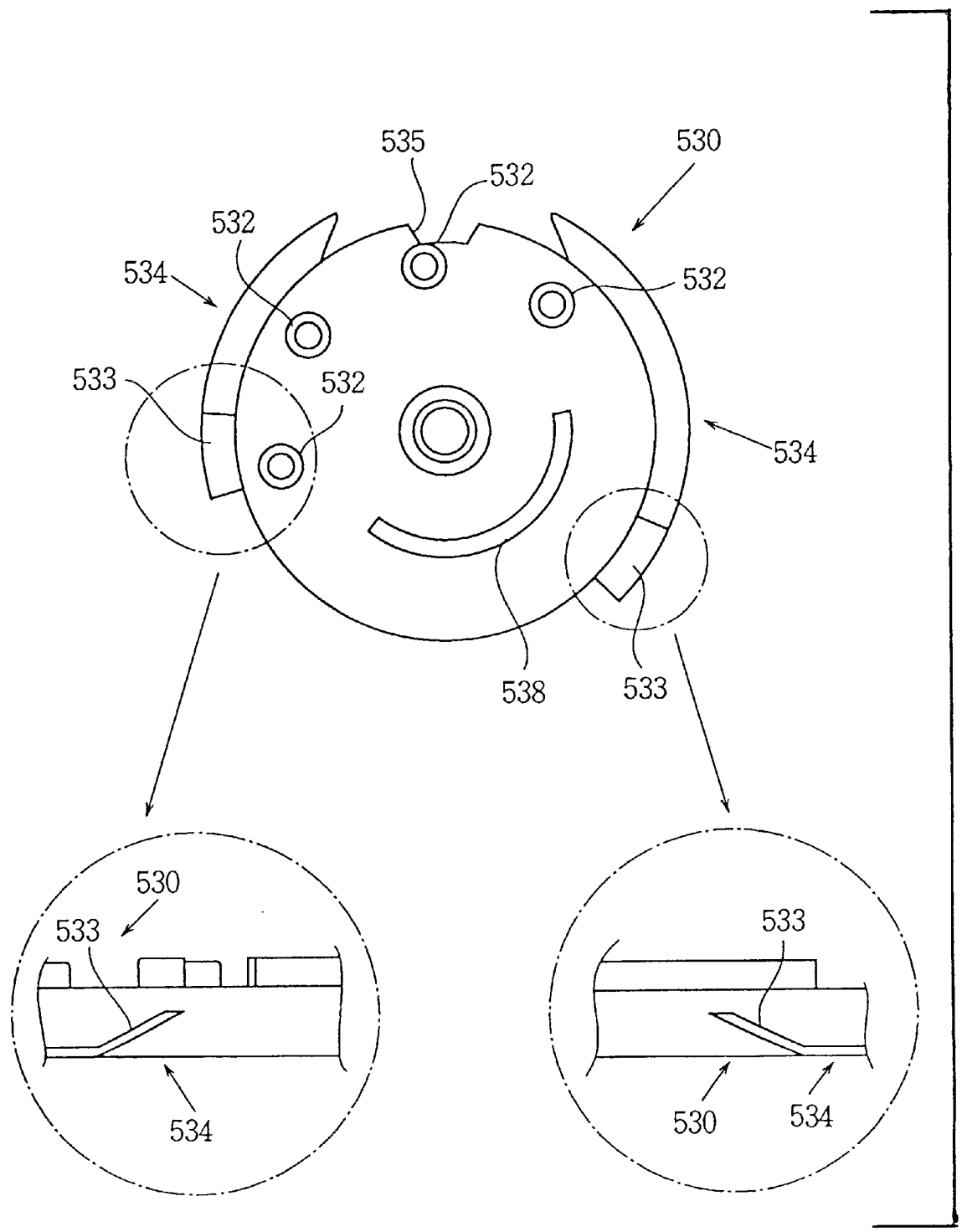
FIG. 6 is an explanatory view showing a cam unit of the loading section of the disc player shown in FIG. 1.

Referring to FIG. 6, the cam unit 530 is provided with a plurality of projections 532 engageable with protruding portions 701 (FIG. 8) of a Geneva structure 700 which will be related later. Further, on the outer periphery surface of the cam unit 530, there are provided cam portions 534 with their ends 533 rising up. Moreover, the cam unit 530 is formed with a groove 535 into which a locking pin 544 of a lock lever 540 (FIGS. 10 and 11) may engage so as to stop the rotation of the cam unit 530.

Figure 13:
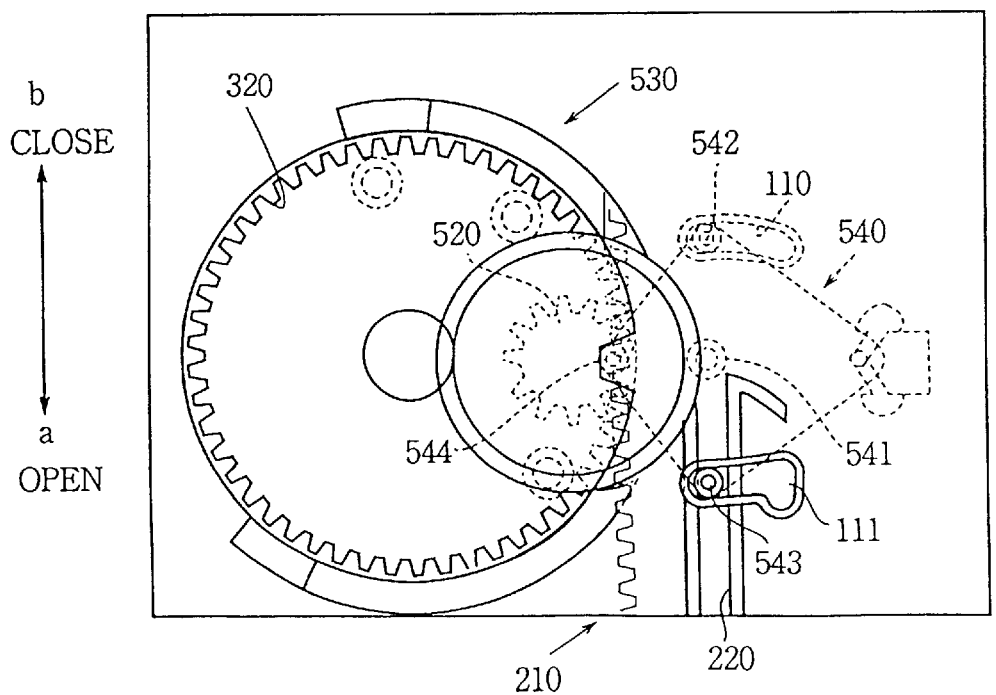
FIG. 13 is an explanatory view illustrating one operation of the disc player of FIG. 1.

Referring to FIG. 3, the lock lever 540 has engaging pins 542 and 543 which may engage into grooves 110 and 111 formed on the loading section 100. When the loading section 100 is in its complete opened position with respect to the base section 200, the lock lever 540 is pivotable about engaging pin 542 (FIG. 13). On the other hand, when the loading section 100 is in its complete closed position, the lock lever 540 is pivotable about the engaging pin 543, as shown in FIG. 3.

When the lock lever 540 is in a condition shown in FIG. 3, the locking pin 544 will engage in the lock groove 535 of the cam unit 530, so that the rotation of the cam unit 530 is stop. At this time, since the engaging pin 543 engages in an elongate guide groove 220 formed on the rack 210, the lock lever 540 may pivot only in clockwise direction, as shown in FIG. 3.

In this construction, when the planetary gear 520 is rotated in the counterclockwise direction so that itself revolves in the clockwise direction engaging with the stationary gear portion 320, the cam unit 530 will at first rotate in the clockwise direction. But, since the lock pin 544 is engaged in the lock groove 535 of the cam unit 530 with a pressing angle of 90 degree, the rotation of the cam unit 530 will be stopped. Thus, through the engagement of the planetary gear 520 with the rack 210, the loading section 100 may be moved in direction a (opening direction). On the other hand, when the planetary gear 520 is caused to rotate in the clockwise direction, the engagement of the planetary gear 520 with the rack 210 will enable the loading section 100 to move in direction b (closing direction).

Further, when the planetary gear 520 in a position shown in FIG. 3 is caused to rotate in the clockwise direction, the planetary gear 520 engages with the stationary gear portion 320 so as to revolve in the counterclockwise direction. Thus, the cam unit 530 connecting with the planetary gear 520 will be forced to rotate in the counterclockwise direction. At this moment, although the lock pin 544 (which is pivotable about the engaging pin 543) is engaged in the groove 535 of the cam unit 530, a small pressing angle of 27 degree fails to stop the rotation of the cam unit 530. Hence, the cam unit 530 will continue to rotate in the counterclockwise direction, causing the lock pin 544 of the lock lever 540 to be pushed off the lock groove 535.

As shown in FIG. 3, since the engaging pin 543 engages in the elongate guide groove 220, the lock lever 540 will not pivot about the engaging pin 542 in a counterclockwise direction. On the other hand, since the engaging pin 542 is freely movable in the clockwise direction, the lock lever 540 will pivot about the engaging pin 543 in the clockwise direction.

In this way, with the operation of the lock lever 540, a locked condition of the cam unit 530 is released. This time, the planetary gear 520 will engage with the stationary gear portion 320 so as to revolve therearound in the clockwise or counterclockwise direction, causing the cam unit 530 to rotate in the same direction, thereby enabling the rotation of the rotary tray 300.

When the loading section 100 is moved from a position shown in FIG. 3 along a direction shown by an arrow a in FIGS. 1 and 2, the engaging pins 543 and 541 of the lock lever 540 will be moved to a terminal end 221 of the elongate groove 220 so as to leave therefrom. Thus, the lock lever 540 is able to pivot about the engaging pin 542 in the counterclockwise direction.

When the planetary gear 520 is rotated in the counterclockwise direction, it will revolve in the clockwise direction, thus the cam unit 530 will be caused to rotate in the clockwise direction in the same manner as described above. At this moment, although the lock pin 544 (which is. pivotable about the engaging pin 542) is engaged in the lock groove 535 of the cam unit 530, a small pressing angle of 27 degree fails to stop the rotation of the cam unit 530. Hence, the cam unit 530 will continue to rotate in the clockwise direction, causing the lock pin 544 of the lock lever 540 to be pushed off the lock groove 535. Thus, since the locking condition of the cam unit 530 is released, the rotary tray 300 will rotate in the counterclockwise direction.

Meanwhile, if the lock lever 540 is caused to pivot about the engaging pin 542 in the counterclockwise direction, the engaging pin 541 will be retained at the end 221 of the guide groove 220 (FIG. 10), thereby restricting the movement of the loading tray 100 in the direction b (closing direction).

Referring again to FIG. 3, a turn table base 600 is provided under the loading section 100. As shown in FIG. 7, the turn table base 600 is vertically pivotable about a shaft 601 and is urged upwardly by an elastic member (not shown). Referring again to FIG. 7, installed on the turn table base 600 is a turn table 602 which is in fact mounted on a spindle shaft of a spindle motor (not shown).

Referring to FIG. 7, the turn table base 600 has a projection 603 formed at one corner thereof. When the cam unit 530 rotates in a clockwise or counterclockwise direction as shown in FIG. 6, end portions 533 of cam portion 534 of the cam unit 530 (FIGS. 3 and 6) will engage with the projection 603 of the turn table base 600. Thus, the projection 603 is gradually forced to deflect downwardly against the upward urging force of the elastic member, causing the turn table base 600 to pivot downwardly with the shaft 601 as a fulcrum. In this way, the turn table 602 is allowed to escape from the hole 314 of the rotary tray 300.

The above operation is needed when the rotary tray 300 is to be rotated. This time, since the turn table 602 is in a position below the hole 314, the rotation of the rotary tray 300 will not be hampered by the turn table 602.

Figure 8:
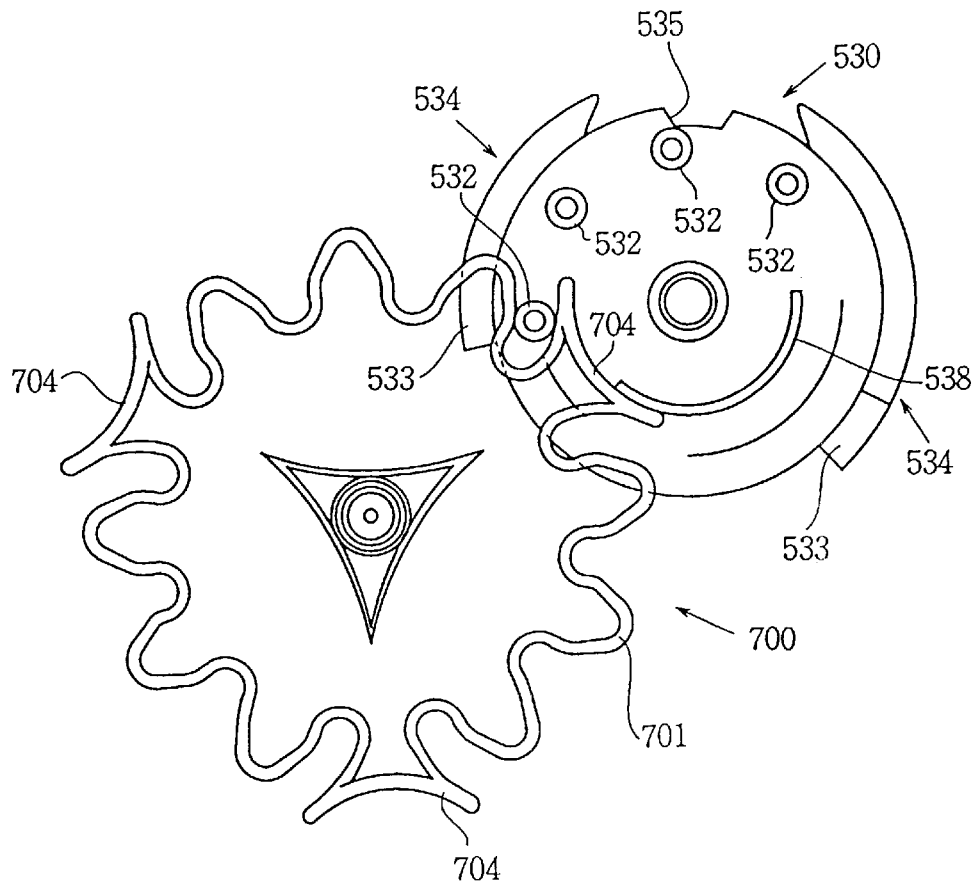
FIG. 8 is an explanatory view showing a relationship between the Geneva structure and the cam unit in the disc player of FIG. 1.

Referring to FIGS. 5 and 8, a Geneva structure 700 is provided under the rotary tray 300. The Geneva structure 700 includes many protruding portions 701 and arc members 704 (each having a concave outer surface) capable of engaging with an arc member 538 of the cam unit 530.

With the rotation of the cam unit 530, each projection 532 of the cam unit 530 will be engaged in turn between two protruding portions 701, thereby causing the rotary tray 300 to rotate. As shown in FIG. 8, when a projection 532 is engaged between two protruding portions 701, the arc member 538 (having a convex arcuate surface) will also engage with the arc member 704, thus further ensuring the engagement of the projection 532 with the protruding portions 701.

Figure 9:
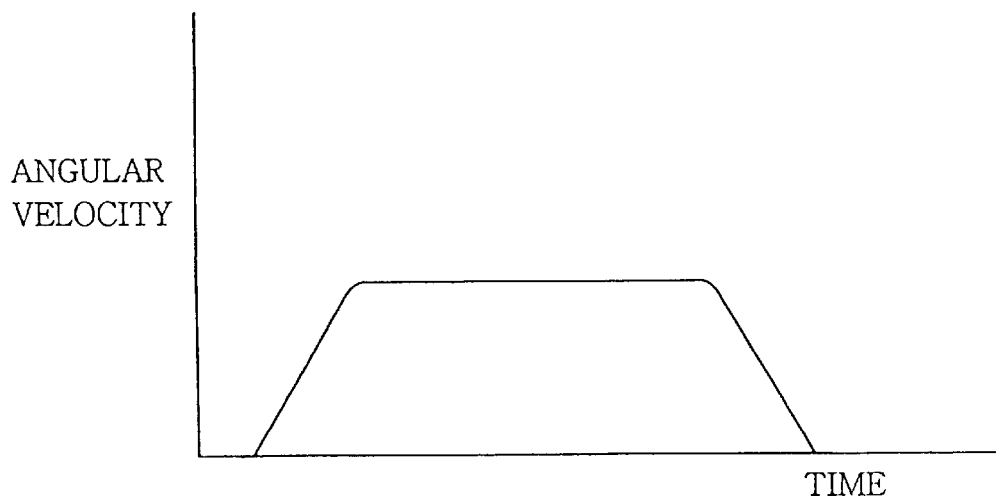
FIG. 9 is a graph indicating a characteristic produced by the Geneva structure shown in FIGS. 5 and 8.

Referring to FIG. 9, with the use of the Geneva structure 700, the angular velocity of the rotary tray 300 will rise gradually at beginning. After arriving at a maximum velocity, the maximum velocity will remain unchanged so that the rotary tray 300 will rotate at a constant maximum angular velocity. When approaching the end of the rotation of the rotary tray 300, the angular velocity will gradually be reduced.

In this way, since the angular velocity of the rotary tray 300 is restricted, it is sure to prevent a disc from being vibrated even when the rotary tray 300 is rotated at an extremely high speed.

Figure 10:
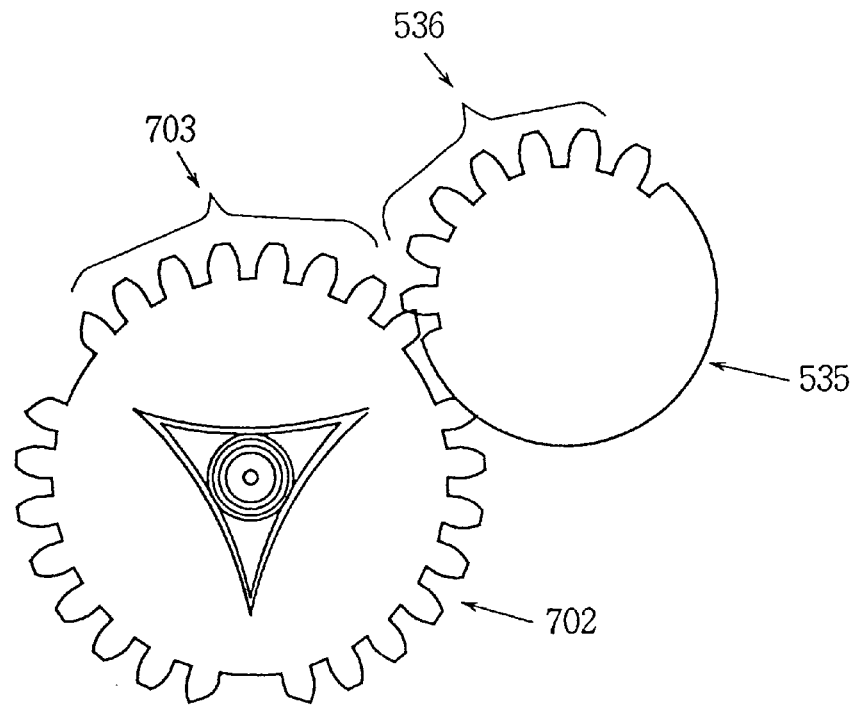
FIG. 10 is an explanatory view showing a conventional rotating force transmitting mechanism.
Figure 11:
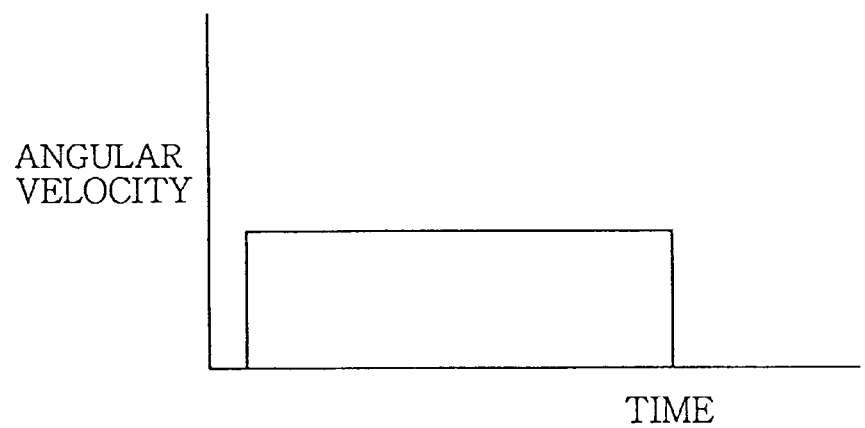
FIG. 11 is a graph indicating a characteristic produced by the conventional rotating force transmitting mechanism shown in FIG. 10.

In fact, the Geneva structure 700 and the cam unit 530 together form a rotating force transmitting mechanism which has been greatly improved over a conventional rotating force transmitting mechanism shown in FIG. 10. As shown in FIG. 10, a cam unit 535 is formed with a gear portion 536 engagable with several gear portions 703 of a gear 702 which is provided under the rotary tray 300, so that a rotating force may be transmitted to the rotary tray 300. However, as shown in FIG. 11, at the beginning of rotation of the rotary tray 300, the angular velocity of the rotary 300 will suddenly increase to its maximum value. At the end of rotation of the rotary tray 300, the angular velocity of the rotary 300 will suddenly decrease to zero. As a result, there is a danger that the discs mounted on the rotary tray 300 will be thrown out, or at least the discs will be vibrated causing a damage to the discs and a noise.

By the way, in the disc player of the present invention, the cam unit 530 and the Geneva structure 700 together form a first operating mechanism for transmitting a driving force from the driving motor 500 to the rotary tray 300, and for moving down the turn table 602 when the rotary tray 300 rotates. The planetary gear 520 and the rack 210 together form a second operating mechanism for transmitting a driving force from the driving motor 500 to the loading section 100 when the loading section 100 is to be linearly moved with respect to the base section 200. The lock lever 540 forms a change-over means for selecting an operation of the first operating mechanism or the second operating mechanism.

The operation of the disc player constructed as described above will be explained in detail below.

When the loading section 100 is in a position (closed position) shown in FIGS. 3 and 4, if the rotary tray 300 is to be rotated, a driving force from the driving motor 500 is transmitted through the belt 501 to the gear pulley 510.

At this time, since the engaging pin 543 of the lock lever 540 is engaged in the guide groove 220, the lock lever 540 is prevented from pivoting about the engaging pin 542 in either clockwise or counterclockwise direction. But, since the engaging pin 542 and the engaging pin 541 are in the conditions shown in FIG. 3, the lock lever 540 may still be pivotable about the engaging pin 543 in the clockwise direction.

Figure 12:
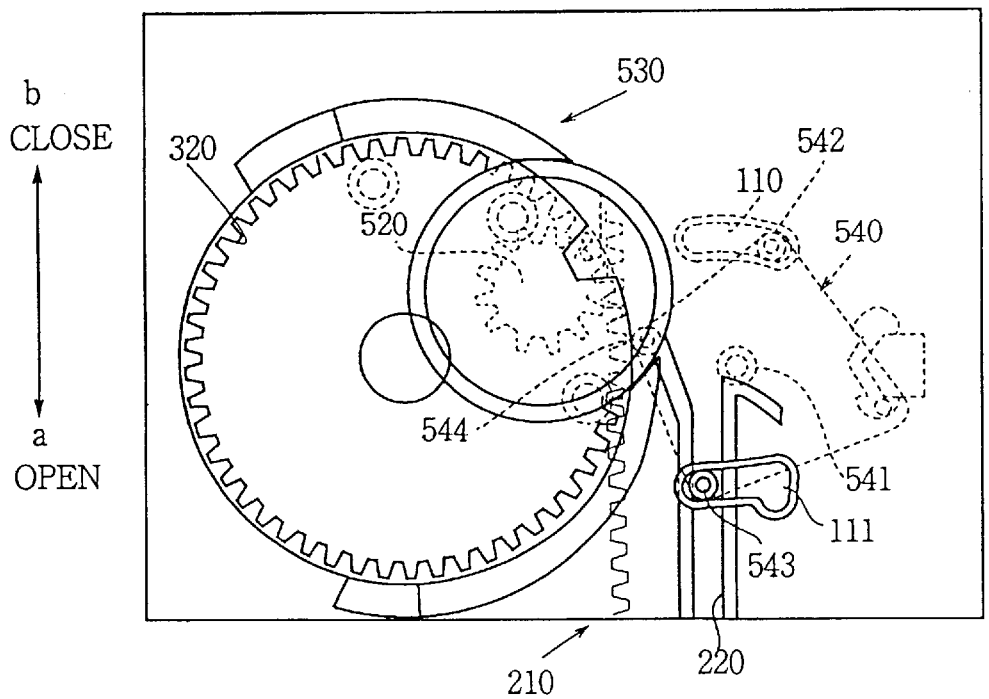
FIG. 12 is an explanatory view illustrating one operation of the disc player of FIG. 1.

When the planetary gear 520 is rotated in the clockwise direction, it will revolve in the counterclockwise direction engaging with the stationary gear portion 320, causing the cam unit 530 to rotate in the counterclockwise direction, so that the engaging pin 544 of the lock lever 540 will be pushed out of the lock groove 535. In this way, as shown in FIG. 12, since the locking action of the lock lever 540 on the cam unit 530 is released, the planetary gear 520 will continue to engage with the stationary gear portion 320 so as to revolve in the counterclockwise direction. As shown in FIG. 8, when the cam unit 530 is rotated in the counterclockwise direction, the projections 532 will be successively engaged between every two protruding portions 701 of the Geneva structure 700, so as to cause the rotary tray 300 to rotate in the clockwise direction.

As understood in FIG. 9, since the angular velocity of the rotary tray 300 will rise gradually at beginning, then arrive at a maximum velocity, finally the angular velocity will be reduced gradually when approaching the end of the rotation of the rotary tray 300, it is possible to prevent a disc from being undesirably vibrated even when the rotary tray 300 is rotated at an extremely high speed.

Further, at this time, when the cam unit 530 rotates in the counterclockwise direction, the end portions 533 of the cam portions 534 of the cam unit 530 (FIGS. 3, 6 and 8) will press down the projection 603 (FIG. 7) of the turn table base 600. Thus, the projection 603 is gradually forced to deflect downwardly against the urging force of the elastic member (not shown), causing the turn table base 600 to pivot downwardly with the shaft 601 as a fulcrum. In this way, the turn table 602 is allowed to escape from the hole 314 of the rotary tray 300. Thus, when the rotary tray 300 is rotated, since the turn table 602 is in a position below the hole 314, the rotation of the rotary tray 300 will not be hampered by the turn table 602.

When it is required to reproduce a disc received in the receiving sections 311–313 of the rotary tray 300, the cam unit 530 is rotated so that the end portions 533 are caused to leave from the projection 603 of the turn table base 600, causing the turn table base 600 to pivot upwardly by virtue of an urging force of the elastic member (not shown). In this way, the turn table 602 operates to hold the center of a disc received in one of the disc receiving sections 311–313, permitting a clamper 401 to chuck the center of the disc (FIG. 7).

On the other hand, when the loading section 100 is to be moved in its opening direction a, the planetary gear 520 is moved to a position shown in FIG. 13.

At this moment, since the engaging pin 543 of the lock lever 540 is engaged in the guide groove 220, the lock lever 540 is prevented from pivoting about the engaging pin 542 in the clockwise or counterclockwise direction.

Therefore, upon the rotation of the planetary gear 520 (engaging with the rack 210) in the counterclockwise direction, the loading section 100 will be pushed in its opening direction a. At this time, the lock pin 544 is in contact with the lock groove 535 of the cam unit 530 at a large angle of 90 degree, thus the cam unit 530 becomes not rotatable, thereby restricting the rotation of the cam unit 530.

Figure 14:
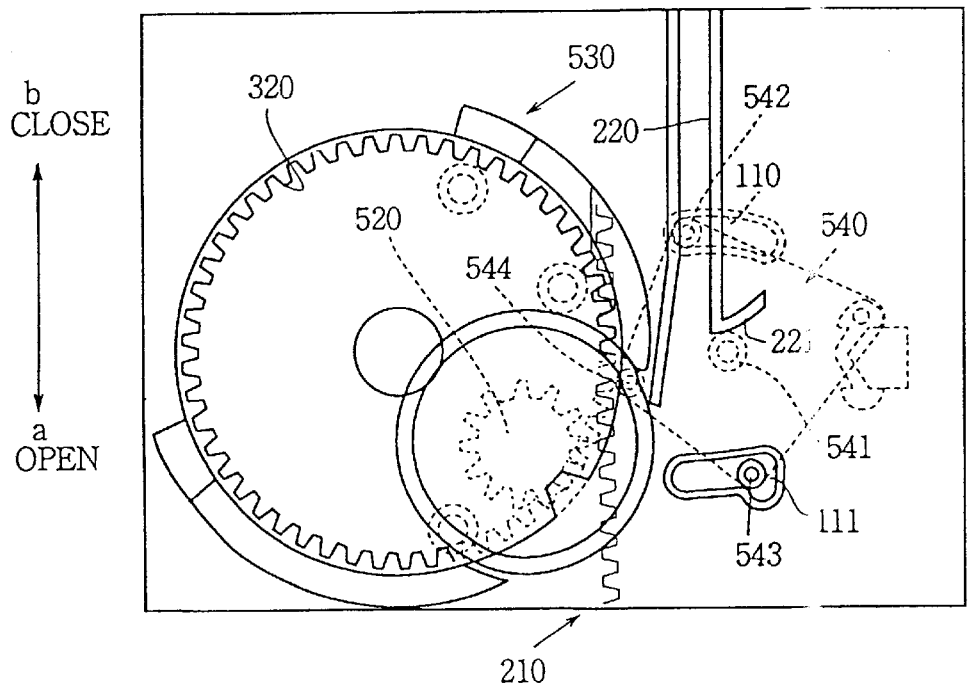
FIG. 14 is an explanatory view illustrating one operation of the disc player of FIG. 1.

Referring to FIG. 14, when the loading section 100 is pushed to an end in its opening direction a, the engaging pin 541 of the lock lever 540 will leave from the groove 220 beyond its end 221.

At this moment, since the engaging pin 542 of the lock lever 540 is engaged in the guide groove 220, the lock lever 540 is prevented from pivoting about the engaging pin 543 in the clockwise or counterclockwise direction.

When the planetary gear 520 is rotated in the counterclockwise direction, the planetary gear 520 itself engages with the stationary gear portion 320 so as to revolve in the clockwise direction. Thus, the cam unit 530 is caused to rotate in the clockwise direction, the lock pin 544 of the lock lever 540 is therefore pushed out of the groove 535. At this moment, once the support pin 544 is pushed out of the lock groove 535, the lock pin 544 will pivot about the engaging pin 542 of the lock lever 540. This time, since the engaging pin 541 is engaged with the end 221 of the guide groove 220 as shown in FIG. 14, it is sure to restrict the movement of the loading section 100 in its closing direction b.

Figure 15:
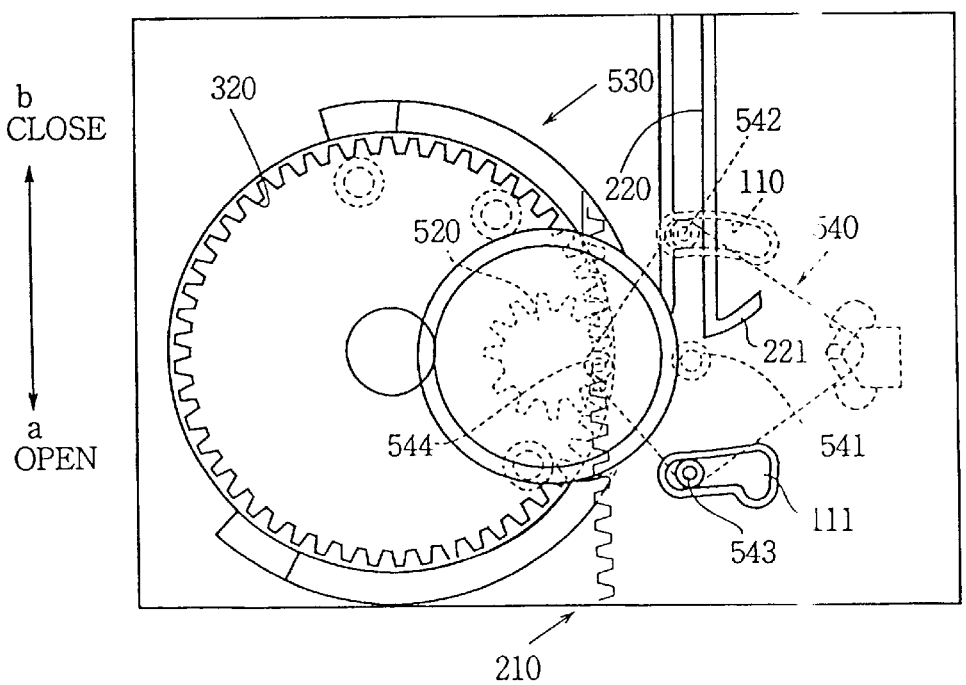
FIG. 15 is an explanatory view illustrating one operation of the disc player of FIG. 1.

In this way, as shown in FIG. 15, since the locking action of the lock lever 540 on the cam unit 530 is released, the planetary gear 520 may revolve in the counterclockwise direction engaging with the stationary gear portion 320. Thus, the cam unit 530 is caused to rotate in the counterclockwise direction, enabling the projections 532 to successively engage with the protruding portions 701 of the Geneva structure 700, causing the rotary tray 300 to rotate in the clockwise direction.

At this time, since the angular velocity of the rotary tray 300 rises gradually at beginning, then arrive at a maximum velocity, finally is reduced gradually when approaching the end of the rotation of the rotary tray 300, it becomes possible to prevent a disc from being vibrated even when the rotary tray 300 is rotated at an extremely high speed.

Further, since the turn table 602 is allowed to escape from a hole 314 of the rotary tray 300, when the rotary tray 300 is rotated, the rotation of the rotary tray 300 will not be hampered by the turn table 602.

When the loading section 100 is to be moved from its opening position to its closing position, the planetary gear 520 is rotated in the clockwise direction so as to change from a position shown in FIG. 14. This time, with the rotation of the cam unit 530 in the counterclockwise direction, the lock pin 544 of the lock lever 540 is pulled back to the lock groove 535 due to a fact that at this moment the lock lever 540 is urged by a spring (not shown) towards the center of the cam unit 530. Then, the lock lever 540 is caused to pivot about the engaging pin 542 in the clockwise direction, so that the engagement of the pin 541 with the end portion 221 of the guide groove 220 is released.

When the engaging pin 544 is completely embedded in the lock groove 535, the lock pin 544 at this time is in contact with the lock groove 535 at a pressing angle of 90 degree, thereby preventing the rotation of the cam unit 530. This time, since the planetary gear 520 is kept engaged with the rack 210, the loading section 100 may be pulled in its closing direction b.

As is understood from the above description, with the use of the present invention, only one driving source is needed to supply a rotating force to the rotary tray 300, to lower down the turn table 602 when rotary tray 300 rotates, to cause the loading section 100 to linearly move with respect to the base section 200, thus performing and completing some necessary operations including disc loading, rotary tray rotating and disc clamping with the use of only a single power source.

Further, with the use of the present invention, since the lock pin 541 of the lock lever 540 is easily engageable with the end 211 of the guide groove 220 of the base section 200, the movement of the loading section 100 with respect to the base section 200 may be easily restricted. Meanwhile, an improved mechanical connection between the loading section 100 and a rack 210 has been established, ensuring that a driving force can be exactly transmitted from the driving system to the loading section 100.

Moreover, with the use of the present invention, since the angular velocity of the rotary tray 300 will rise gradually at beginning, then arrive at a maximum velocity, finally the angular velocity will be reduced gradually when approaching the end of the rotation of the rotary tray 300, it is possible to prevent a disc from being undesirably vibrated even when the rotary tray 300 is rotated at an extremely high speed.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A disc player comprising:
   a base section;
   a loading section mounted on the base section and linearly movable with respect to the base section;
   a rotary tray rotatably mounted on the loading section for mounting a plurality of discs arranged circumferentially on the rotary tray at equal angular intervals;
   a driving motor provided in the loading section for producing a driving force;
   a turn table provided under the rotary tray, the turn table being capable of moving up and down, so as to mount a disc when the turn table moves up;
   a first operating mechanism for transmitting a driving force from the driving motor to the rotary tray, and for moving down the turn table when the rotary tray is to be rotated;
   a second operating mechanism for transmitting a driving force from the driving motor to the loading section for moving the loading section; and change-over means for selecting an operation of the first operating mechanism or the second operating mechanism, the change-over means including an engagement pin and being movable along an elongate groove in a direction of motion of the loading section, wherein the first operating mechanism initially unclamps one disc of the plurality of discs prior to rotating the rotary tray by one angular interval, and then clamps the one disc of the plurality of discs after rotating the rotary tray by one angular interval.

2. The disc player according to claim 1, wherein the first operating mechanism includes a cam unit and a Geneva structure.

3. The disc player according to claim 1, wherein the second operating mechanism includes a planetary gear and a rack, wherein the planetary gear is adapted to engage a cam unit.

4. The disc player according to claim 1, wherein the change-over means includes a lock lever having a lock pin to engage in a lock groove formed in a cam unit so as to lock the cam unit.

5. The disc player according to claim 1, wherein the change-over means restricts the movement of the loading section.

6. The disc player according to claim 1, wherein the first operating mechanism includes a cam unit for transmitting a driving force to the rotary tray and to the turntable.

7. The disc player according to claim 6, wherein the cam unit includes a plurality of projections for transmitting a driving force to the rotary tray, and further includes a cam portion for effecting a downward movement of the turntable.

8. The disc player of claim 1, wherein the change-over means includes an engagement pin that is movable along an elongate groove in a direction of motion of the loading section.

9. The disc player of claim 1, wherein the first operating mechanism includes a cam unit for receiving the driving force from the driving motor, the first operating mechanism being driven by the driving force, wherein the cam unit includes means for unclamping and means for clamping, the means for unclamping and the means for clamping cooperating with a clamper, wherein the cam unit further includes driving means engageable with the rotary tray for rotating the rotary tray, and wherein one rotation of the cam unit rotates the rotary tray by one angular interval and sequentially unclamps and clamps the one disc on the rotary tray.

10. A disc player comprising:

a base section;

a loading section mounted on the base section and linearly movable with respect to the base section;

a rotary tray rotatably mounted on the loading section for receiving a plurality of discs;

a driving motor provided in the loading section for producing a driving force;

a turn table provided under the rotary tray, the turn table being capable of moving up and down, so as to mount a disc when the turn table moves up;

a first operating mechanism for transmitting a driving force from the driving motor to the rotary tray, and for moving down the turn table when the rotary tray is to be rotated;

a second operating mechanism for transmitting a driving force from the driving motor to the loading section for moving the loading section; and change-over means for selecting an operation of the first operating mechanism or the second operating mechanism, the change-over means including an engagement pin and being movable along an elongate groove in a direction of motion of the loading section, wherein the first operating mechanism includes a cam unit for transmitting a driving force to the rotary tray and to the turntable, wherein the cam unit includes a plurality of projections for transmitting a driving force to the rotary tray, and further includes a cam portion for effecting a downward movement of the turntable, wherein each of the plurality of projections is formed to be engageable between any two of a plurality of protruding portions of a Geneva structure.

11. A disc player comprising:

a base section;

a driving motor for producing a driving force;

a loading section mounted on the base section and linearly movable with respect to the base section in response to the driving force;

a rotary tray rotatably mounted on the loading section for mounting a plurality of discs arranged circumferentially on the rotary tray at equal angular intervals;

an operating mechanism provided underneath the rotary tray for transmitting the driving force from the driving motor to the rotary tray, wherein the operating mechanism includes a Geneva structure having a plurality of protruding portions, wherein each one of a plurality of cam pins formed on a cam unit is engageable between any two of the plurality of protruding portions, the cam unit further having a convex surface for slidably engaging corresponding concave surfaces of the Geneva structure; and a lock lever coupled to the operating mechanism and including an engagement pin slidable along a groove in a direction of the linear motion of the loading section in response to the driving force, wherein, in response to the driving force, the operating mechanism initially unclamps one disc of the plurality of discs prior to rotating the rotary tray by one angular interval, and then clamps the one disc of the plurality of discs after rotating the rotary tray by one angular interval.

12. The disc player according to claim 11, wherein the rotary tray is adapted to receive three discs equally and symmetrically arranged thereon.

13. The disc player of claim 11, wherein the cam unit receives the driving force from the driving motor, the operating mechanism being driven by the driving force, wherein the cam unit includes means for unclamping and means for clamping, the means for unclamping and the means for clamping cooperating with a clamper, wherein the cam unit further includes driving means engageable with the rotary tray for rotating the rotary tray, and wherein one rotation of the cam unit rotates the rotary tray by one angular interval and sequentially unclamps and clamps the one disc on the rotary tray.

14. A disc player comprising:

a base section;

a loading section mounted on the base section and linearly movable with respect to the base section;

a rotary tray rotatably mounted on the loading section for receiving a plurality of discs;

a driving motor provided in the loading section for producing a driving force;

a turn table provided under the rotary tray, the turn table being capable of moving up and down, so as to mount a disc when the turn table moves up;

a first operating mechanism for transmitting a driving force from the driving motor to the rotary tray, and for moving down the turn table when the rotary tray is to be rotated, the first operating mechanism including a cam unit coupled to the driving motor and to a Geneva structure, the cam unit having a convex arcuate surface for slidably engaging corresponding concave arcuate surfaces of the Geneva structure, the cam unit further having a plurality of cam pins each engageable between any two of a plurality of protruding portions of the Geneva structure;

a second mechanism for transmitting a driving force from the driving motor to the loading section for moving the loading section; and change-over means for selecting an operation of the first operating mechanism or second operating mechanism.

15. The disc player according to claim 14, wherein in the first operating mechanism an accelerating cam pin of the plurality of cam pins is engaged between two of the plurality of protruding portions of the Geneva structure at an initial stage of rotation of the rotary tray, wherein a decelerating cam pin is engaged between another two of the plurality of protruding portions of the Geneva structure at a final stage of the rotation of the rotary tray, and wherein angular velocities at the initial stage of the rotation of the rotary tray and the final stage of the rotation of the rotary tray are substantially less than an angular velocity at an intermediate stage of the rotation of the rotary tray.

16. The disc player according to claim 14, wherein a second operating mechanism includes a planetary gear and a rack, wherein the planetary gear is adapted to engage the cam unit.

17. The disc player according to claim 14, wherein the change-over means includes a lock lever having a lock pin to engage in a lock groove formed in the cam unit so as to lock the cam unit.

18. The disc player according to claim 14, wherein the change-over means restricts the movement of the loading section.

19. A disc player comprising:

a base section;

a driving motor for producing a driving force;

a loading section mounted on the base section and linearly movable with respect to the base section in response to the driving force;

a rotary tray rotatably mounted on the loading section for receiving a plurality of discs;

an operating mechanism provided underneath the rotary tray for transmitting the driving force from the driving motor to the rotary tray, the operating mechanism including a Geneva structure having a plurality of protruding portions, wherein each one of a plurality of cam pins formed on a cam unit are engageable between any two of the plurality of protruding portions, the cam unit further having a convex surface for slidably engaging corresponding concave surfaces of the Geneva structure; and a lock lever coupled to the operating mechanism and including an engagement pin slidable along a groove in a direction of the linear motion of the loading section in response to the driving force.

* * * * *